CATHODE RAY TUBE PRINTER

Filed Dec. 24, 1959 3 Sheets-Sheet 1

INVENTOR
FRED W. SCHAAF

BY G. R. Gugger
AGENT

CATHODE RAY TUBE PRINTER

Dec. 4, 1962 F. W. SCHAAF 3,067,407

CATHODE RAY TUBE PRINTER

Filed Dec. 24, 1959 3 Sheets-Sheet 3

United States Patent Office 3,067,407

Patented Dec. 4, 1962

3,067,407

CATHODE RAY TUBE PRINTER

Fred W. Schaaf, Apalachin, N.Y., assignor to International Business Machines Corporation, New York, N.Y., a corporation of New York Filed Dec. 24, 1959, Ser. No. 861,972
7 Claims. (Cl. 340—173)

Figure 1A:
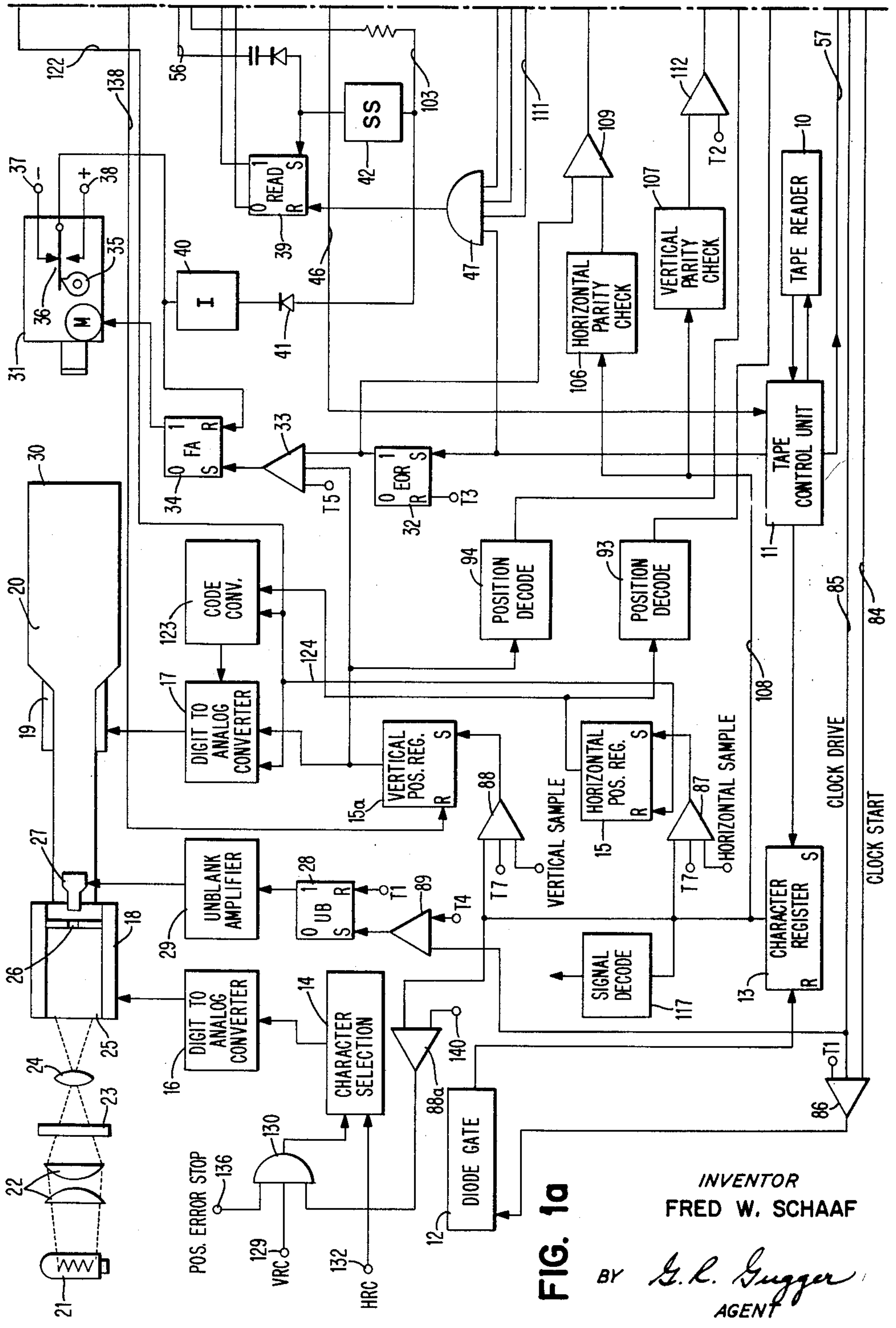

This invention relates to a cathode ray tube printer and more particularly to a printer provided with control means operable to print special error characters.

The present invention is directed to a cyclically operable printer system which functions to transform information from magnetic tape into a character display on the face of a cathode ray tube. This display is then photographed on 35 mm. microfilm to make a permanent record of the displayed information. In a printer system of this nature when an error in printing occurs, it is a distinct advantage if the system can be operated to give a visual indication of the error. For example, a visual error indication helps a programmer discover discrepancies in a new program by pinpointing the point in the program at which the error occurred and the type of error. There may have been programmed too many characters in a line or too many lines. Also, some records are not greatly damaged by certain errors and error characters are a great asset in determining the seriousness of an error, whether it be a programming type error or a redundancy error from tape. Error characters also provide a diagnostic aid in servicing the printer system.

In carrying out the above visual error indication feature, the printer system is provided with suitable diode matrix means for sampling the digital input information for a position error or a redundancy error. When a position error or a redundancy error is detected, a special character is printed on the film in the space between the normal print area and the retrieval code area and the machine is stopped. The type of character and its vertical location identifies the vind of error which occurred. For example, the detection of a vertical redundancy error coupled with a decoded end-of-line signal from the tape will initiate a Print Error Character signal which in turn controls the character selection circuitry to unblank the special error character [symbol]. In addition, the Print Error Character signal is used to reset a Horizontal register and to adjust the currents supplied to the positioning coils of the tube so that the [symbol] error character is printed to the left of the line in which the error was detected. In the case of a longitudinal redundancy error, the special error character [symbol] will be printed to the left of the line in which the error is detected. A vertical redundancy error should normally lead to a horizontal redundancy error since a bit would have been added or lost in one channel of the tape record. In this event, the longitudinal redundancy error character will be superimposed on the vertical redundancy error character, identifying this condition. For a horizontal position error, the same character as for a vertical redundancy error will be printed to the left of the line where the error is detected. A vertical position error will print the same character as a vertical redundancy error and a horizontal position error; however, in this case a Vertical register will be reset so that the error character will be printed to the left of line 0.

Accordingly, the main object of the present invention is to provide an improved cathode ray tube printer system provided with control means operable to print special error characters indicative of certain type errors.

A further object of the present invention is to provide a cathode ray tube printer system which functions to transform digital input information from magnetic tape into a character display on the face of the tube and then to photograph the display on film, the system being further provided with error detection means for sampling said digital input information and control means responsive to said error detection means for printing special error characters.

A still further object of the present invention is to provide a cathode ray tube printer system as in the preceding object wherein said error detection means samples the digital information for horizontal and vertical positioning errors and for horizontal and vertical redundancy errors.

A still further object of the present invention is to provide a cathode ray tube printer system as in the preceding objects wherein said control means operates to adjust the currents supplied to the positioning coils of the tube to effect printing of the error characters to the left of the line in which the error is detected, the type of character and its vertical location identifying the kind of error which occurred.

The foregoing and other objects, features and advantages of the invention will be apparent from the following more particular description of a preferred embodiment of the invention, as illustrated in the accompanying drawings.

In the drawings:

FIG. 1*a* is a block diagram showing the general arrangement of the system embodying the invention and including part of the logic circuitry for the printing of error characters.

Figures 1C, 2:
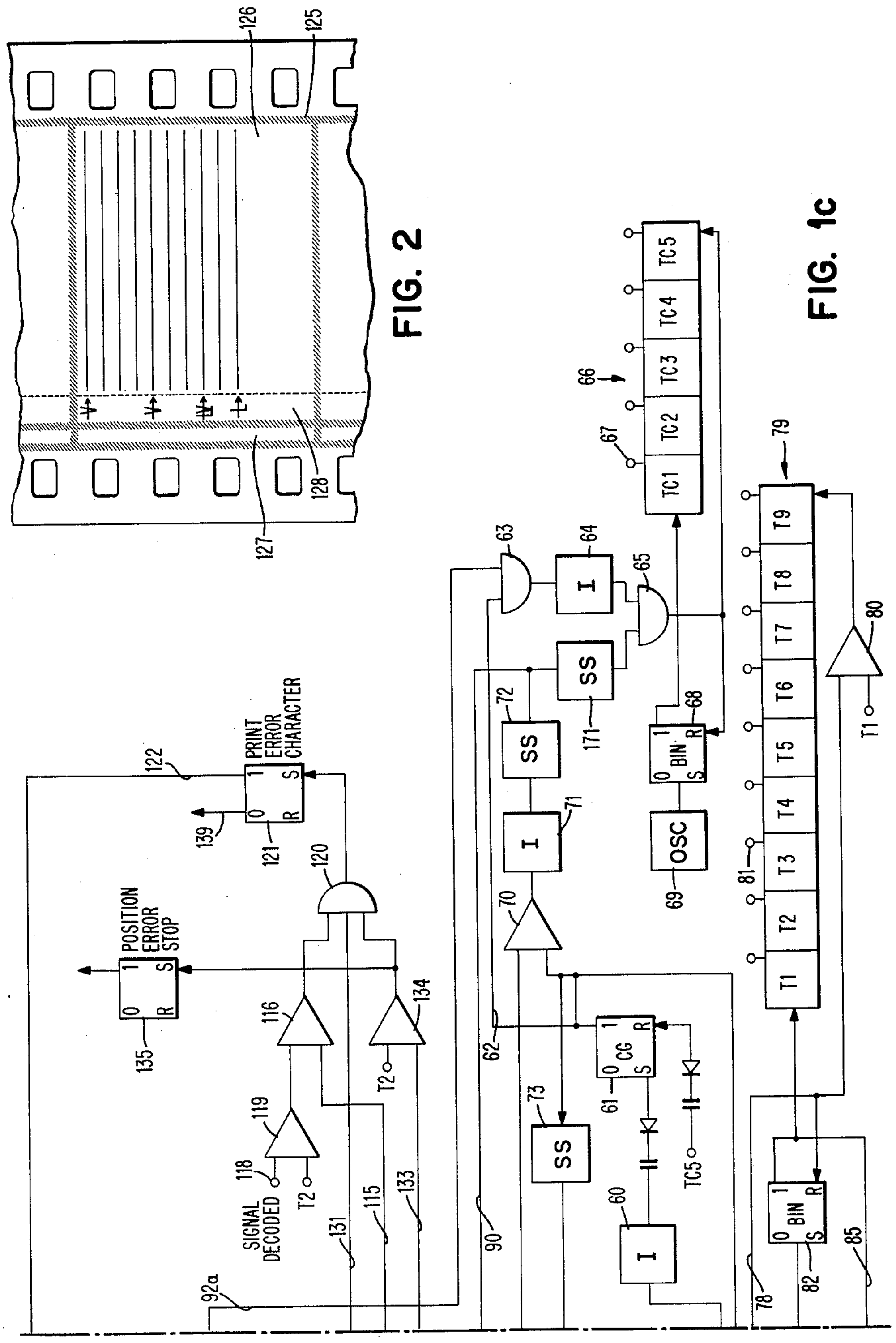
Figure 1B:
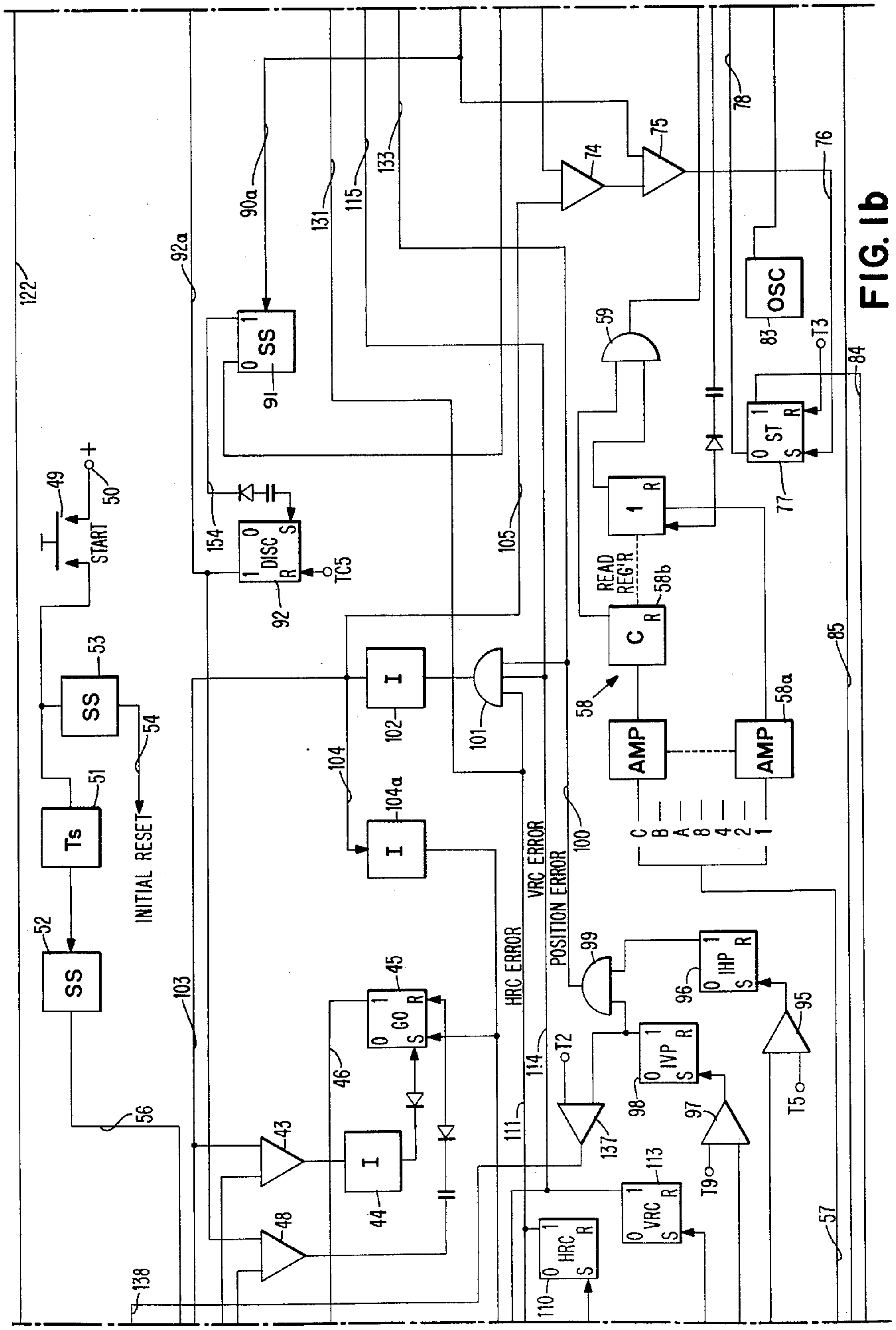

FIGS. 1*b* and 1*c* are diagrams of the remaining logic circuitry for the error character feature as applied to the system shown in FIG. 1*a*.

FIG. 2 is a view of a film frame with error characters recorded on it.

Referring to FIG. 1*a*, there is shown the general arrangement of the printer system for transforming information from magnetic tape into a character display on the face of a cathode ray tube. The Tape Reader 10, which scans the digital data recorded on a magnetic tape, may be any convenient type of reader such as, for example, the well-known "IBM" Type 729 Tape Reader. In the present instance, the information read from the tape is in a binary coded decimal seven bit code pattern with each alphanumeric character being expressed in the CBA8421 code. The CBA8421 notation refers to the seven recording channels on the tape and which run parallel to the length of the tape. A bit of information is represented by a magnetized spot in a channel and the channels BA8241 are used to record either a numeric or an alphanumeric character in binary form. The seventh or C channel is used to record a redundary check bit. That is, either a 0 or 1 is recorded in the seventh channel so that across the seven channels there is an even number of 1's in each set of seven bits. When the tape is read, the number of 1's is automatically checked. If the number is odd, the machine stops and an error light is turned on. If the number of 1's is even, the machine continues the reading and writing process. For example, the character A would be recorded on the tape and read as 1110001. From the Tape Reader, the input information is passed to a suitable type of Tape Control unit or synchronizer 11, portions of which will be later described, which acts as a buffer storage between the tape unit and the printer. The control unit shapes and stores the information bits from the tape and interprets controls between the printer and tape unit, such as supplying the necessary delays for tapes to be reversed, stopped, etc.

From the Tapc Control unit, the information is gated by means of a Diode Gate 12 into a seven bit Character register 13, and from the Character register, it is distributed to a 6 line (BA8421) Character Selection bus 14 and to the Horizontal and Vertical Positioning registers 15 and 15*a*. In a normal print operation, a print control character will follow a signal character to set up and initiate printing. The next two characters will determine the horizontal position of the first printed character, the next two characters will determine the vertical position, and the fifth character, through the Selection bus, will determine the alphanumeric character to be printed. Each subsequent character will print an alphanumeric character, the Horizontal register advancing one character position per character after the first alphanumeric character has been positioned. Subsequent characters will be printed one per cycle, each character being automatically positioned one space to the right of the previous one, and printing will continue in this fashion until the end of a line is signaled by a signal character. The character following a signal character is recognized as a control character which selects the next line to be printed. Printing may be done at 128 characters per line, 76 lines per page at 6 lines per inch.

The digital information passing through the Selection bus and the Horizontal and Vertical Positioning registers is directed to respective Digital-To-Analog converters 16 and 17 which convert the parallel digital information to a corresponding current for use in the selection deflection yoke 18 and the positioning deflection yoke 19 of the cathode ray tube 20. The system preferably makes use of digital-to-analog circuitry such as is fully disclosed in U.S. Patent No. 2,810,860, to which reference may be had for complete details of operation.

The cathode ray tube 20 is preferably of the image forming type wherein a tungsten lamp 21 and condenser lens assembly 22 are used to illuminate an external matrix array of symbols 23. The arrangement of the characters in the make-up of the letter chart on the matrix follows, in this case, from the standard Teletype code and the use of binary stepped increments of horizontal and vertical deflection currents. The matrix is reduced by the lens 24 and focussed on the cathode ray tube photosensitive cathode 25 where the light images become current images. The photoelectrons liberated from the cathode when the matrix letter chart is projected on it are accelerated and focussed upon the plane of a selecting aperture 26. The aperture size is such that one letter only from the array can pass through it at a time. The magnetic deflection yoke coils 18 deflect the entire electron-image stream for letter-by-letter selection. The single-letter portion of the electron stream emerging from the aperture enters the positioning and reproducing end of the tube. Here it passes axially through a metal cylinder 27, the potential of which is maintained a few volts negative with respect to the aperture in order to suppress secondary emission. The cylinder 27 is under control of an Unblank Control trigger 28 and an Unblank amplifier 29 to selectively pass the letter beam on to the high potential region where the positioning deflection yoke coils 19 focus and position the letter on the aluminized phosphor screen 30. The reproduced letters may be displayed in lines and columns as desired.

The data on the tube screen is photographically recorded on 35 mm. film by a conventional recording camera 31. The system preferably makes use of a recording camera such as is fully disclosed in Manual No. 203, dated July 1, 1955, and published by the Instrumentation Branch, Edwards A.F.B., California, to which reference may be had for complete details of operation. It will suffice to say here that a drive motor M is connected through a magnetic clutch-brake to a gear train which is the basic drive mechanism of the camera. This gear train, in turn, drives the shutter, in-out feed sprockets, the intermittent or frame positioning sprocket, and the synchronizing cams. On continuous or cine operation, film may be fed at the rate of 16 frames per second. The system may be programmed to give a film advance at the end of a printed line or at the first end-of-record mark in that line. For example, referring to FIG. 1*a*, when an end-of-record mark is encountered on the tape in the Tape Reader, a signal is emitted from the Tape Control unit 11 to set an End-Of-Record trigger 32. It will be understood that in the description of the system logic that follows, whenever a trigger is turned on or set, the binary 1 output line will rise and the binary 0 output line will fall and that these outputs will reverse when the trigger is turned off or reset. The positive output from the trigger 32 is switched at T5 clock cycle time, to be later described, by an AND switch 33 to effect the setting of a Film Advance trigger 34. The positive output from the Film Advance trigger turns on the camera motor M to initiate a film advancing cycle. The camera gear train drives a cam 35 which coacts with the center strap of transfer camera contacts 36. The normally closed side of the camera contacts is connected to a negative voltage terminal 37 whereas the normally open side is connected to a positive voltage terminal 38, and approximately 70 milliseconds after the camera receives the impulse to feed film, the contacts will transfer to close the positive side and will remain there during film feeding. After one frame of film has been fed, the cam 35 will transfer the camera contacts back to close the negative side. The Film Advance trigger 34 is reset upon closure of the negative side of the camera contacts at the end of each feed cycle, and similarly, a Read trigger 39 is set through an inverter 40, rectifier 41, and single shot multivibrator 42. The positive output from the Read trigger is gated through an AND switch 43 and inverter 44 to a Go trigger 45 (FIG. 1*b*). The Go trigger is set and the positive output therefrom is transmitted by wire 46 back to the Tape Control unit 11 to signal that the film feed has stopped and that another section of tape is to be fed and scanned by the Tape Reader. The Read trigger 39 can be reset through an OR switch 47 by the end-of-record signal from the Tape Control unit indicating that a film advance cycle is about to take place during which time there should be no scanning of the tape. The positive output from the reset side of the Read trigger is normally gated through an AND switch 48 to reset the Go trigger to signal the Tape Control unit that tape is not to be fed during the film advance cycle.

There has been briefly described thus far the general operation of the printer system. The more detailed description to follow will be concerned with the novel frame reprint arrangement as applied to a system of the foregoing type.

With film suitably loaded in the camera 31, the system is initially put into operation by depressing a start key 49 (FIG. 1*b*), located in the Tape Control unit 11, to connect the positive voltage terminal 50 to a well-known Schmitt trigger 51, which in turn triggers a 100 microsecond single shot multivibrator 52. Depression of the start key also turns on a 40 microsecond single shot multivibrator 53 having an initial reset output line 54. Although not shown, it will be understood that output line 54 is suitably connected to the reset side of various triggers, registers, etc., of the system to initially reset these components at the start of operation. The output from the single shot 52 is transmitted through line 56 to the set side of the Read trigger 39 (FIG. 1*a*) to turn this trigger on. The positive output from the Read trigger is also gated through the AND switch 43 and inverter 44 to turn on the Go trigger 45, and hence, the Tape Control unit is signaled to initiate the feeding and reading of a section of tape in the Tape Reader 10.

The first character read from the tape is transmitted via a cable 57 and loaded into a Read register 58 (FIG. 1*b*), which comprises an amplifier 58*a* and trigger 58*b* for each bit position, and the first bit of this character passing through an OR switch 59 and an inverter 60 will set a Character Gate trigger 61. The positive output from the Character Gate trigger is passed via line 62 through an OR switch 63, inverter 64, and OR switch 65 to the reset line of a closed clock ring 66 in the Tape Control unit. The clock ring 66, when in a reset condition, has stage TC1 turned on with an output being delivered from the output terminal 67. The setting of the Character Gate trigger serves to disable the clock reset circuit, thereby conditioning the ring for operation. The Character Gate trigger output is similarly passed to the reset side of a Binary trigger 68 to condition this trigger for operation. A 476 kc. crystal controlled oscillator 69 is stepped down to 238 kc. by the Binary trigger 68, the output of which now drives the 5 stage clock ring to deliver timed outputs TC1 through TC5 at the output terminals to control the timing of the Tape Control unit. The positive output from the Character Gate trigger 61 is also gated through an AND switch 70 and inverter 71 to turn on a Record Gate 150 microsecond single shot multivibrator 72. At the end of a character cycle, which is approximately 33.7 microseconds in duration, the Character Gate trigger will be reset by the fall of the TC5 clock pulse from the last stage of the clock ring 66. The fall of the Character Gate trigger output will turn on a 10 microsecond single shot multivibrator 73, the output of which is gated through the AND switches 74 and 75 to bring up a CRT Write line 76 for 10 microseconds. The fall of the Character Gate trigger output is also connected to reset the Read register 58. The rise of the CRT Write line will set a Clock Start trigger 77 and the output line 78 from the "0" side of this trigger is a reset line which connects to a closed clock ring 79 in the printer through an AND switch 80. Similar to clock ring 66, when in a reset condition, stage T1 is turned on with an output being delivered from the output terminal 81 of stage T1. The setting of the Clock Start trigger 77 serves to disable the clock reset circuit, thereby conditioning the ring for operation. The reset line 78 is also connected to the reset side of a Binary trigger 82 and thus the Binary trigger is also conditioned for operation. A 333 kc. crystal controlled oscillator 83 is stepped down to 167 kc. by the Binary trigger 82, the output of which now drives the 9 stage clock ring 6 microsecond per stage to deliver timed outputs T1 through T9 at the output terminals to control the timing of the printer. The 10 microsecond signal on the CRT Write line is used to start the printer clock at the beginning of each tape cycle.

The output line 84 from the Clock Start trigger 77 and the clock drive output line 85 from the Binary trigger 82 are used to activate an AND switch 86 (FIG. 1*a*) at T1 time and the output from switch 86 turns on the Diode Gate 12. The Diode Gate conditions the Character register 13 for operation, and at T1 time of each clock cycle of the clock ring 79, information read from the tape will be set in the Character register. Following receipt of the signal character and the print control character for initiating a print cycle, the next two characters will be gated through an AND switch 87, under control of clock pulse T7 and a machine generated horizontal sample pulse which extends through the first two cycles of operation of the printer clock ring 79, to set the Horizontal Positioning register. In similar fashion, the next two characters received will be gated through an AND switch 88, under control of clock pulse T7 and a machine generated vertical sample pulse which extends through the next two cycles of operation of the printer clock ring 79, to set the Vertical Positioning register. Accordingly, the positioning deflection yoke 19 will be energized to position the character to be printed. The next character received will be gated by an AND switch **88*a* through the Selection bus 14 to select the desired character beam, and at T4 clock pulse time of the next clock cycle, the AND switch 89 will be activated to set the Unblank Control trigger 28**. Accordingly, the selected character will be unblanked on the tube screen and photographed on the film. Successive character print cycles will follow until an end-of-record mark initiates a film advance cycle as previously described.

During normal forward feeding of the tape, the Record Gate 150 microsecond multivibrator 72 (FIG. 1*c*) is turned on every character cycle and remains on as long as characters are being gated in. When the end of a record is encountered and the Character Gate trigger 61 fails to fire, the multivibrator 72 will switch off and the drop on lines 90 and **90*a* will cause a Disconnect Delay Multivibrator 91** (FIG. 1*b*) to turn on. When multivibrator 91 turns off 400 microseconds later, a Disconnect trigger 92 will be turned on and the positive output on line **92*a* will start the tape unit clock 66 for another character cycle. The turn on of the Disconnect trigger 92** coupled with an end-of-record signal will result in the Read and Go triggers being turned off and the Film Advance trigger being turned on to initiate a film frame advance.

Referring to FIG. 1*a*, it will be noted that the outputs of the Horizontal Position register and the Vertical Position register are also directed through associated Position decoders 93 and 94. The decoders may take a number of forms but preferably comprise a suitable diode circuit arrangement which will permit certain predetermined characters which should not be accepted by the printer to gate through and give an error pulse. An error pulse from the Horizontal Position Decoder 93 will be directed at T5 clock pulse time through an AND switch 95 (FIG. 1*b*) to set an Invalid Horizontal Position trigger 96, and in similar fashion, an error pulse from the Vertical Position decoder 94 will be directed at T9 clock pulse time through an AND switch 97 to set an Invalid Vertical Position trigger 98. An output from either the Horizontal Position trigger or the Vertical Position trigger will be directed through an OR switch 99, line 100, an OR switch 101 and an inverter 102 to lower a CRT Ready line 103. The CRT Ready line 103 is normally up and the drop that occurs as a result of a positioning error, is transmitted by line 104, inverter **104*a*, and the OR switch 47** (FIG. 1*a*) to effect turn off of the Read and Go triggers 39 and 45 to stop tape feeding and reading operations. Also, when the CRT Ready line 103 drops, line 105 will drop to disable the AND switch 74 and prevent the CRT Write line 76 from coming up and the Clock Start trigger 77 and printer clock 79 from turning on.

In addition to the error position checks, there are also provided a Horizontal Parity checker 106 and a Vertical Parity checker 107 (FIG. 1*a*). Information in the Character register is passed directly to these checkers by way of line 108. The Horizontal Parity checker 106 comprises seven binary triggers which correspond to the seven channels on the tape being read by the Tape Reader. If all of the channels of a tape record contain an even number of recorded bits, then the binary triggers will all be off and there will be no output error pulse. However, if one of the tape channels contained an odd number of bits, the corresponding binary trigger would be on, and at end-of-record time, the resulting output error pulse would be gated through an AND switch 109 to set a Horizontal Redundancy Check trigger 110 (FIG. 1*b*). The output from the trigger 110 is directed through the OR switch 47 to reset the Read trigger 39 and stop tape operations. Also, the rise on line 111 passes through the OR switch 101 and will be inverted by inverter 102 and lines 103 and 105 (FIG. 1*b*) will fall, thus disabling the AND switch 74 to prevent restarting of the printer clock 79. The Vertical Parity checker 107 comprises suitable diode circuitry for testing the CBA8421 channels of tape data. If the bits in the set of channels CBA8421 are odd, an output error pulse will be gated through an AND switch 112 at T2 clock pulse time to set a Vertical Redundancy Check trigger 113. In similar fashion, the output from trigger 113 is directed through OR switch 47 to reset the Read trigger and is also directed by way of line 114 and OR switch 101 to cause lines 103 and 105 to fall to prevent restart of the printer clock 79.

Taking the case of a vertical redundancy error first, the output rise of the Vertical Redundancy trigger 113 is directed by way of the lines 114 and 115 to an AND switch 116 (FIG. 1*c*). When the end of the line in which the vertical redundancy error occurred is reached, an end-of-line signal character on the tape is picked up and decoded by a suitable Diode Matrix decoder 117 (FIG. 1*a*) and the output signal of decoder 117 is directed to terminal 118 of an AND switch 119 (FIG. 1*c*). At T2 clock cycle time, the AND switch 119 is activated and the positive output activates the AND switch 116, the output of which is directed through an OR switch 120 to turn on a Print Error Character trigger 121. Turn on of trigger 121 indicates that an error character is to be printed in a special location on the film frame and the positive output from the trigger is directed by line 122 to a Code Converter 123 (FIG. 1*a*), to the Digital-To-Analog converter 17, and by line 124 to reset the Horizontal Positioning register 15.

Referring to FIG. 2, there is shown an example of a microfilm frame 125 comprising a record area 126 and a retrieval code area 127. In the embodiment of the present invention, a preferred location for recording the error characters is in the area designated as 128 between the retrieval code area and the record area. The output signal from the Print Error Character trigger 121 going directly to the Digit-To-Analog converter 17 will adjust the currents in the positioning coils 19 so that the beam position is adjusted from the right end of the line in which the error occurred horizontally back over to the left side of the retrieval code area 127 and the same output signal goes directly to the reset side of the Horizontal Positioning register 15 and also to the Code converter 123 to further adjust the currents in positioning coils 19 so that the beam position is adjusted horizontally from the retrieval code area to the error character area 128. As indicated at the left of FIG. 1*a*, the output signal from the Vertical Redundancy trigger 113 (FIG. 1*b*) is also taken to terminal 129 of an OR switch 130 and when this trigger was turned on, as a result of a vertical redundancy error, the output signal was transmitted by the OR switch 130 and the Character Selection bus 14 to the Digit-To-Analog converter 16 and the currents in the selection coils 18 were adjusted to select the error character beam -V> from the character matrix 23 to be unblanked by the Unblank trigger 28 at T4 clock cycle time. The error character -V> indicates a vertical redundancy type error and it is positioned, in the manner described above, to the left of the line in which the error occurred as shown, for example, at line 4 of the film frame in FIG. 2, the first line of recording being line 0.

In the case of a horizontal redundancy error, the Horizontal Redundancy trigger 110 is turned on and the output signal is transmitted by lines 111 and 131 and OR switch 120 to turn on the Print Error Character trigger 121. Accordingly, the beam position is adjusted to the error character area 128 at the left of the line where the horizontal redundancy error occurred. The output signal from the Horizontal Redundancy trigger 110 is also connected to a terminal 132 (FIG. 1*a*) of the Character Selection bus 14 causing the Digit-To-Analog converter 16 to adjust the currents in the selection coils 18 to select the error character beam -L> for recording as shown, for example, at line 9 of the film frame in FIG. 2. A vertical redundancy error should normally lead to a longitudinal redundancy error since an information bit has either been added or lost in one channel of the tape record. In this case, the horizontal error character -L> will be superimposed upon the vertical error character -V> as shown, for example, at line 7.

Referring again to FIGS. 1*b* and 1*c*, a vertical position error will turn on the Invalid Vertical Position trigger 98 and a horizontal position error will turn on the Invalid Horizontal Position trigger 96 and an output signal from either of these triggers will be transmitted by OR switch 99, lines 100 and 133, to an AND switch 134 (FIG. 1*c*). The AND switch 134 is gated at T2 clock cycle time and the output signal is transmitted through the OR switch 120 to turn on the Print Error Character trigger 121, and as before, the beam position is adjusted to the error character area 128. The signal from AND switch 134 also turns of a Position Error Stop trigger 135. The output of trigger 135 connects to terminal 136 of OR switch 130 (FIG. 1*a*) to effect the selection of the error character -V> for both a horizontal position error and a vertical position error. In the case of a horizontal position error, the character -V> is recorded to the left of the line in which the error occurred; however, for a vertical position error, the character -V> is recorded to the left of line 0, which is the first recording line on the film frame, to distinguish this type of error. This is effected by gating the output signal from the Invalid Vertical Position trigger 98 through an AND switch 137 at T2 clock cycle time and transmitting the signal by line 138 to reset the Vertical Positioning register 15*a*. The output of register 15*a*, then, adjusts the currents to positioning coils 19 to record the error character opposite line 0, as shown in FIG. 2.

There has thus been described the novel feature for printing a character indicative of the type of error in the space between the normal print area and the retrieval code area on the film frame whenever a position error or redundancy error is detected and it will be understood that other types of error characters could be used and that different error character areas on the film frame could be used if desired by simply changing the error signals supplied to the Digit-To-Analog converters.

Although not shown, the output line 139 from the 0 side of the Print Error Character trigger 121 (FIG. 1*c*) is connected to terminal 140 of the AND switch 88*a* (FIG. 1*a*) to disable the AND switch when trigger 121 is turned on, thus preventing the flow of information from the Character register to the Character Selection bus 14 when an error character is to be recorded.

When it is desired to resume normal operation of the machine, the start key 49 is depressed and all of the error triggers will be reset from the Initial Reset line 54.

While the invention has been particularly shown and described with reference to a preferred embodiment thereof, it will be understood by those skilled in the art that various changes in form and details may be made therein without departing from the spirit and scope of the invention.

What is claimed is:

1. In a cyclically operable cathode ray tube printer system having control circuitry for transforming digital input information into a character display on the face of the tube, the combination of, character selection means responsive to said digital input information for selecting the character to be displayed, positioning means responsive to said digital input information for positioning the character to be displayed, error detection means for sampling said digital input information for a position error and a redundancy error, a first signal means responsive to said error detection means upon detection of an error for controlling said character selection means to select an error character for display, and a second signal means responsive to said first signal means for controlling said positioning means to position said selected error character.

2. In a cyclically operable cathode ray tube printer system having control circuitry for transforming digital input information into a character display on the face of the tube, the combination of, character selection means responsive to said digital input information for selecting the character to be displayed, horizontal and vertical positioning means responsive to said digital input information for positioning the character to be displayed, error detection means for sampling said digital input information for horizontal and vertical positioning errors and for horizontal and vertical redundancy errors, a plurality of signal means individually responsive to said error detection means upon detection of an error for controlling said character selection means to select an error character for display which is indicative of the type of error detected, and other signal means responsive to said plurality of signal means for controlling said positioning means to position said selected error character.

3. In a cyclically operable cathode ray tube printer system having control circuitry for transforming digital input information into a character display on the face of the tube, the combination of, character selection means responsive to said digital input informaiton for selecting the characters to be displayed, horizontal and vertical positioning means for positioning the selected characters, a horizontal positioning register and a vertical positioning register responsive to said digital input information for controlling said positioning means to position selected characters in parallel line form across the tube face, error detection means for sampling said digital input information for horizontal and vertical positioning errors and for horizontal and vertical redundancy errors, a plurality of signal means individually responsive to said error detection means upon detection of an error for controlling said character selection means to select an error character for display which is indicative of the type of error detected, and other signal means responsive to said plurality of signal means for controlling said positioning means and said horizontal register to position said selected error character adjacent the line in which the error was detected.

4. In a cyclically operable cathode ray tube printer system having control circuitry for transforming digital input information into a character display on the face of the tube, the combination of, character selection means responsive to said digital input information for selecting the characters to be displayed, horizontal and vertical positioning means for positioning the selected characters, a horizontal positioning register and a vertical positioning register responsive to said digital input information for controlling said positioning means to position selected characters in parallel line form across the tube face, a horizontal position decoder responsive to said horizontal register for detecting a horizontal position error, a vertical position decoder responsive to said vertical register for detecting a vertical position error, a horizontal parity checker and a vertical parity checker operative to sample said digital input information for horizontal and vertical redundancy errors, signal means individually responsive to each of said position decoders and parity checkers upon detection of an error for controlling said character selection means to select an error character for display which is indicative of the type of error detected, and other signal means responsive to each of said first signal means for controlling said positioning means and said horizontal register to position said selected error character adjacent the line in which the error was detected.

5. A cyclically operable cathode ray tube printer system as in claim 4 and including means responsive to said vertical position decoder for controlling said vertical positioning register whereby a vertical position error character will be positioned adjacent the first line of characters.

6. A cyclically operable cathode ray tube printer system as in claim 3 and including means for photographing the tube display onto a film frame, said film frame comprising a normal print area, a retrieval code area, and an error character area interposed between said normal print area and retrieval code area, said other signal means controlling said positioning means and said horizontal register to position the selected error characters in said error character area.

7. A cyclically operable cathode ray tube printer system as in claim 3 and including switching means rendered effective upon detection of an error by said error detection means for preventing further control of said character selection means by said digital input information.

References Cited in the file of this patent

UNITED STATES PATENTS

| | | |
|---|---|---|
| 2,596,741 | Tyler et al. | May 13, 1952 |
| 2,830,285 | Davis et al. | Apr. 8, 1958 |
| 2,900,132 | Burns et al. | Aug. 18, 1959 |

OTHER REFERENCES

Review of Input and Output Equipment Used in Computing Systems, published by A.I.E.E., March 1953, pp. 78–79 relied on.